(12) United States Patent
Parker et al.

(10) Patent No.: US 7,276,366 B2
(45) Date of Patent: Oct. 2, 2007

(54) BIOLOGICAL SCRUBBER ODOR CONTROL SYSTEM AND METHOD

(75) Inventors: Richard D. Parker, Poway, CA (US); Eric C. Davis, Poway, CA (US); Roop C. Jain, Poway, CA (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 0 days.

(21) Appl. No.: 11/350,358

(22) Filed: Feb. 8, 2006

(65) Prior Publication Data
US 2007/0180802 A1    Aug. 9, 2007

(51) Int. Cl.
*B01D 53/84* (2006.01)
(52) U.S. Cl. .................. 435/266; 423/210; 423/242.1; 423/237; 423/245.1; 423/235; 423/DIG. 5; 423/DIG. 17; 422/105
(58) Field of Classification Search ........... 423/210, 423/242.1, 237, 245.1, 235, DIG. 17, DIG. 5; 435/266; 422/105
See application file for complete search history.

(56) References Cited

U.S. PATENT DOCUMENTS

| | | | |
|---|---|---|---|
| 5,232,676 A * | 8/1993 | Wolff et al. ............... | 423/210 |
| 5,445,660 A | 8/1995 | Koers | |
| 5,480,550 A | 1/1996 | Sublette | |
| 5,858,768 A * | 1/1999 | Bonnin et al. ............ | 435/266 |
| 6,168,711 B1 * | 1/2001 | Teramachi et al. ........ | 210/123 |
| 6,194,198 B1 | 2/2001 | Koers | |
| 6,283,309 B1 | 9/2001 | Koers | |
| 6,358,729 B1 | 3/2002 | Ferranti | |
| 6,383,389 B1 | 5/2002 | Pilgrim et al. | |

FOREIGN PATENT DOCUMENTS

| | | | |
|---|---|---|---|
| JP | 63-130122 A | * | 6/1988 |
| JP | 1-317525 A | * | 12/1989 |
| JP | 4-330915 A | * | 11/1992 |

OTHER PUBLICATIONS

David Gabriel et al., "Biotrickling Filters for POTWs Air Treatment: Full-Scale Experience with a Converted Scrubber," *Odors and Toxic Air Emissions*, 2002, Water Environmental Federation.
David Gabriel et al., "Conversion of Full-Scale Wet Scrubbers to Biotrickling Filters for $H_2S$ Control at Publicly Owned Treatment Works," *Journal of Environmental Engineering*, Oct. 2004.
David Gabriel et al., "Technical and Economical Analysis of the Conversion of a Full-Scale Scrubber to a Biotrickling Filter for Odor Control," *Water Science and Technology*, 2004, IWA Publishing, vol. 50 No. 4 pp. 309-318.

* cited by examiner

*Primary Examiner*—Timothy C. Vanoy (57) ABSTRACT

A system and method for the purification and biodeodorizing of a gas are disclosed. The system is highly adaptable and capable of operating in a variety of modes to tailor performance of the system to specific odor control applications. The scrubber stages of the system may each be maintained at different conditions to selectively promote bacterial activity that targets a variety of odorous constituents. The pH level of the irrigation fluid provided to each scrubber stage may be controlled.

23 Claims, 8 Drawing Sheets

BIOLOGICAL SCRUBBER ODOR CONTROL SYSTEM AND METHOD

BACKGROUND OF THE INVENTION

1. Field of the Invention

The present invention relates, generally, to control systems and methods for removing undesirable constituents from fluid streams. More specifically, the invention relates to a biological treatment system and method for cleansing and deodorizing gas effluents by reducing the concentration of odorous constituents present.

2. Description of Related Art

Increased industrialization and population growth in urban settings over the past several decades have presented important environmental concerns. Significant design problems are associated with the removal of unwanted odorous constituents from effluent gas streams when public health and aesthetic considerations make it desirable to do so.

Various techniques have been developed in response to the need for removal of odorous constituents from effluent gas streams. As a general rule, an effective technique should be tailored to the particular compound to be targeted. For example, in a sewage system environment, a primary cause of odor is hydrogen sulfide. This compound is detectable by the human olfactory sense at very low concentrations. In addition to the unpleasant odor associated with it, hydrogen sulfide is noted for its toxicity and its capacity for corroding materials with which it comes in contact.

Hydrogen sulfide is not the only undesirable constituent found in effluent gases. Others, such as amines, mercaptans and organic acids can be produced from a variety of sources. Because of the undesirability of introducing such constituents into the atmosphere, communities and governmental agencies may often formulate criteria for their regulation. A suitable odor control system, meeting such criteria, would substantially reduce the likelihood of any public nuisance or annoyance by removing, in a cost effective manner, substantial amounts of unwanted substances, preferably at or near the source of their production.

Removal of odorous constituents from a waste gas stream can be accomplished by several techniques. In the past, the treatment of polluted gases was performed mainly by means of chemical and physical processes. While chemical scrubbing, for example, is a well-established and reliable technique, it is associated with high operating and maintenance costs and involves the usage of hazardous chemicals.

In response to such drawbacks, biological treatment has emerged as an alternative technology for odor control and has demonstrated an ability to successfully treat high flows of contaminated gas with high inlet pollutant concentrations. In such systems, a biomass of pollutant-degrading microorganisms is cultivated on the surface of media packing in a scrubber column. The conversion of pollutants to innocuous compounds is mediated by the microorganisms as the contaminated air is passed through the biological scrubber column.

Biological scrubber columns have been disclosed. For example, in U.S. Pat. No. 5,445,660, Koers discloses an apparatus for cleaning gases with the aid of organic filtration material. Further, Bonnin et al., in U.S. Pat. No. 5,858,768, disclose a method for purifying and biodeodorizing gas effluents charged with pollutant matter.

BRIEF SUMMARY OF THE INVENTION

In accordance with one or more embodiments, the invention relates to an odor treatment system. The odor control system can comprise a biological scrubber, disposed to receive process gas, comprising first and second scrubber stages and a scrubber sump in fluid communication with the first scrubber stage, an irrigation source fluidly connected to the biological scrubber, and a controller configured to generate a first control signal that establishes a first liquid circuit from the scrubber sump to the biological scrubber and further configured to generate a second control signal that establishes a second liquid circuit from the irrigation source to the biological scrubber.

In accordance with one or more embodiments, the invention relates to a computer-readable medium including computer-readable signals stored thereon defining instructions that, as a result of being executed by a computer, instruct the computer to perform a method of regulating operation of a biological scrubber system comprising acts of irrigating a first biological scrubber stage of the biological scrubber system during a first irrigation mode of operation and irrigating a second biological scrubber stage of the biological scrubber system during a second irrigation mode of operation. The first irrigation mode is performed during a first predetermined time period and the second irrigation mode is performed during a second predetermined time period.

In accordance with one or more embodiments, the invention relates to a method for controlling odor in a gas stream. The method can comprise acts of contacting the gas stream with a first biologically active surface, wetting the first biologically active surface with a first liquid stream, contacting the gas stream with a second biologically active surface and wetting the second biologically active surface with a second liquid stream during a predetermined time interval.

In accordance with one or more embodiments, the invention relates to a method for treating odor in a fluid. The method can comprise acts of contacting the fluid with a first active surface, wetting the first active surface with a first liquid stream having an acidic pH, contacting the fluid with a second active surface, and wetting the second active surface with a second liquid stream having a pH greater than the pH of the first liquid stream.

In accordance with one or more embodiments, the invention relates to a method for controlling odor in a gas stream. The method can comprise acts of providing a scrubber column, establishing a first liquid circuit for a predetermined period of time from a scrubber sump to a first biologically active stage of the scrubber column, establishing a second liquid circuit from an irrigation source to a second biologically active stage of the scrubber column after the predetermined period of time has elapsed, and contacting the gas stream with the first and second biologically active surfaces to reduce a concentration of odorous constituents therein.

In accordance with one or more embodiments, the invention relates to a method for treating odor in a gas stream. The method can comprise acts of providing a scrubber column comprising a scrubber sump, a first biologically active stage and a second biologically active stage, contacting the gas stream with the first and second biologically active stages to reduce a concentration of target constituents, directing liquid from the scrubber sump to the first biologically active stage, maintaining a pH level of the liquid from the scrubber sump within a predetermined pH range, and directing liquid from an irrigation source to the second biologically active stage.

In accordance with one or more embodiments, the invention relates to a method of facilitating controlling odor in a gas stream. The method can comprise acts of providing a biological scrubber column comprising an inlet fluidly connected to a source of the gas stream, and providing a controller configured to generate a first control signal that establishes a first liquid circuit from a scrubber sump to the biological scrubber column and further configured to generate a second control signal that establishes a second liquid circuit from an irrigation source to the biological scrubber column.

In accordance with one or more embodiments, the invention relates to a method of modifying an existing biological odor control system. The method can comprise acts of providing a computer-readable medium including computer-readable signals stored thereon defining instructions that, as a result of being executed by a computer, instruct the computer to perform a method of regulating operation of a biological scrubber system comprising acts of irrigating a first biological scrubber stage of the biological scrubber system during a first irrigation mode of operation and irrigating a second biological scrubber stage of the biological scrubber system during a second irrigation mode of operation. The first irrigation mode is performed during a first predetermined time period and the second irrigation mode is performed during a second predetermined time period.

Other advantages, novel features and objects of the invention will become apparent from the following detailed description of the invention when considered in conjunction with the accompanying drawings.

BRIEF DESCRIPTION OF THE DRAWINGS

The accompanying drawings are not intended to be drawn to scale. In the drawings, each identical or nearly identical component that is illustrated in various figures is represented by like numeral. For purposes of clarity, not every component may be labeled in every drawing. Preferred, non-limiting embodiments of the present invention will be described with reference to the accompanying drawings, in which.

DETAILED DESCRIPTION OF THE INVENTION

This invention is not limited in its application to the details of construction and the arrangement of components as set forth in the following description or illustrated in the drawings. The invention is capable of embodiments and of being practiced or carried out in various ways beyond those exemplarily presented herein.

In accordance with one or more embodiments, the invention relates to one or more systems and methods for controlling odor in a fluid stream. In typical operation, the odor control system may receive process gas from sources such as municipal waste treatment plants. Process gas may be moved through the system by an operation upstream or downstream of the system, such as by being blown through or pulled through the system. As used herein, the term process gas refers to any gas, bearing at least one undesirable odorous constituent, deliverable to the odor control system for treatment. More specifically, the process gas may carry hydrogen sulfide, ammonia, organic sulfides, amines, and/or other substances either hazardous to human health and/or at least objectionable to people in the vicinity of the gas producing source. The type and concentration of odorous constituents in the process gas may be site-specific.

The odor control system of the present invention may be a biological odor control system in which a biomass of pollutant-degrading or converting microorganisms is cultivated on, for example, the surface of media packing in a scrubber column. The conversion of pollutants to innocuous compounds is typically facilitated or mediated by the microorganisms as the contaminated process gas is passed through the biological scrubber column.

The odor control system of the present invention provides flexibility in a variety of odor control applications. The operation of the system may be tailored to target the odorous constituents present in the process gas at any given site. For example, the scrubber stages of the biological scrubber column may each be maintained at different conditions to selectively promote bacterial activity that targets a variety of odorous constituents. More specifically, the pH level of each scrubber stage may be maintained so as to promote bacterial activity targeting a particular odorous constituent. This may be accomplished, for example, by controlling the pH level of irrigation fluid provided to each scrubber stage. Alternatively, all scrubber stages may be maintained at the same condition.

The odor control system of the present invention may be capable of operating in multiple modes to provide this flexibility. The system may operate in any one mode or in a combination of modes to tailor the performance or a condition of at least a portion of the system to target the odorous constituents present in the process gas at any given site. For example, the modes of operation may control the conditions at which the various scrubber stages are maintained. More specifically, the modes of operation may control the pH level of irrigation fluid provided to each scrubber stage to selectively promote bacterial activity.

A first mode of operation may be appropriate when various types of odorous constituents are present in the process gas but it may be beneficial to dedicate a portion of the scrubber column to target a particular odorous constituent. More specifically, this first mode may be utilized when certain conditions would promote the growth of bacteria predominantly efficient in removing a particular target constituent. For example, a first scrubber stage may be maintained at a low pH to promote the growth of bacteria predominantly efficient in removing hydrogen sulfide, such as Thiobacillus thiooxydans, Thiobacillus thioparus and Thiobacillus intermedius. A second scrubber stage may then serve as a polishing stage, maintained at a higher pH to promote the growth of a wider range of bacteria capable of removing residual target constituent as well as other odorous constituents present in the process gas.

A second mode of operation may be useful when a particular odorous constituent is present at a significantly greater concentration than others in the process gas. In this mode, the odor control system may act virtually as a single-stage system, maintained throughout at conditions selected to promote the growth of bacteria primarily efficient in removing the predominant odorous constituent. For example, all of the scrubber stages may be maintained at a low pH to target hydrogen sulfide.

A third mode of operation may be suitable for applications where no single odorous constituent dominates in the process gas. In this mode, a pH gradient may be maintained within the scrubber column to promote the growth of a wide variety of bacteria to treat a wide variety of odorous constituents. The modes of operation enumerated above will be described in greater detail further on, yet the system of the present invention should be understood to be capable of operating in additional modes not herein mentioned.

Figure 1:
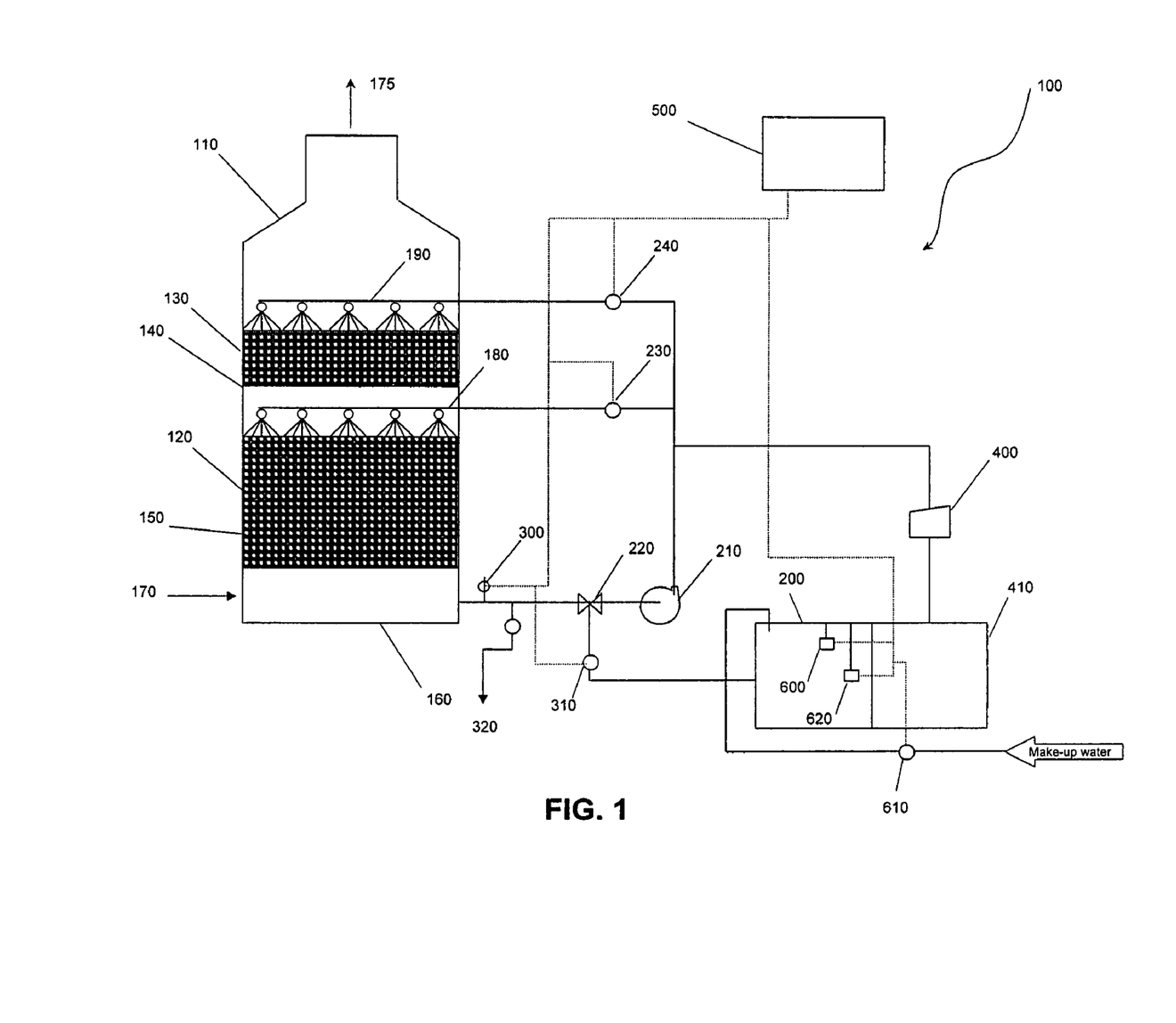
FIG. 1 schematically shows a system in accordance with one or more embodiments of the invention.

Referring now to the drawings and, more particularly to FIG. 1 thereof, odor control system 100 is described which is constructed in accordance with one or more embodiments of the present invention. Components of odor control system 100 may be made of any material chemically and physically suitable for use in accordance with the conditions of the invention. For example, the material may be fiberglass or polyethylene.

Odor control system 100 includes at least one scrubber column 110. The size and/or configuration of scrubber column 110 may be dictated by factors such as, but not limited to, the type and concentration of odorous constituents present in the process gas, the desired degree of deodorization and the volumetric flow rate of process gas through system 100. Scrubber column 110 may have any geometry, for example, round or rectangular, in cross-section. Scrubber column 110 may include a first scrubber stage 120 and a second scrubber stage 130, typically arranged in series, each supported by a separate media support plate 140. Alternatively, one skilled in the art may recognize that scrubber stages 120, 130 may reside in separate scrubber columns. Each scrubber stage 120, 130 comprises media packing to promote attachment of biomass 150. The media packing may comprise any inorganic media that supports biological activity and typically is inert to the byproducts of any biological reaction. For example, in some embodiments of the invention, open-pore polyurethane foam with high specific surface area may be used as the media packing. The depth of scrubber stages 120, 130 may be site-specific to provide sufficient media surface area and residence time to treat the process gas. Prevention of media compression may be an additional consideration in establishing the depth of scrubber stages 120, 130.

Odor control system 100 typically includes an irrigation source 200 disposed to provide irrigation fluid used to wet scrubber stages 120, 130 and promote growth of biomass 150. As used herein, the irrigation fluid can be, for example, water from any commonly known source. An additive may be utilized to adjust characteristics of the irrigation fluid, such as pH, if desired. Odor control system 100 may include a means for moving the irrigation fluid through scrubber column 110. For example, an irrigation pump 210 may aid in the delivery of irrigation fluid to scrubber stages 120, 130. Scrubber column 110 can also include a scrubber sump 160 capable of collecting irrigation fluid which has passed through one or both of scrubber stages 120, 130, depending upon the selected mode of operation.

In some embodiments, odor control system 100 can include sensors for measuring at least one property or operating condition of the system, such as pH sensor 300. In another embodiment, odor control system 100 may include sensors for temperature, salinity and pressure drop, for example, at different points in the system thus allowing further monitoring. In accordance with other embodiments of the present invention, odor control system 100 can also include a controller 500 for adjusting or regulating at least one operating parameter of the system or a component of the system, such as, but not limited to, actuating valves and pumps.

Liquid circuits may operate within odor control system 100. These liquid circuits may function in controlling the pH level of irrigation fluid provided to each scrubber stage. For example, various modes of operation may establish different liquid circuits to selectively promote bacterial activity. A first liquid circuit may fluidly connect scrubber sump 160 to the first scrubber stage 120. A second liquid circuit may fluidly connect irrigation source 200 to the second scrubber stage 130. A third liquid circuit may fluidly connect scrubber sump 160 to the second scrubber stage 130. As used herein, the term liquid circuit is intended to define a particular connection and arrangement of valves and lines that allows a liquid stream to flow therein.

Prior to normal operation of odor control system 100, the media packing of scrubber stages 120, 130 is typically inoculated with bacteria to develop biomass 150. For example, cultured bacteria, an activated sludge containing a multitude of bacteria, or other source of bacteria may be supplied to scrubber column 110. In some embodiments of the invention, activated sludge can be introduced into irrigation source 200 and delivered via irrigation pump 210 to scrubber column 110. The scrubber column 110 is filled to capacity with irrigation fluid and the irrigation fluid may be recycled via irrigation pump 210 from scrubber sump 160 to the second scrubber stage 130 during a bacterial colony-establishing period of acclimation which can last about one week.

During acclimation, process gas may be introduced into scrubber column 110 at inlet 170 initially at a reduced flow rate, such as about 25-50% of the design process gas flow rate, thereafter ramping up as biomass 150 develops. It is believed that because the media packing of scrubber stages 120, 130 typically contains no organic carbon for the bacteria to feed on, the autotrophic bacteria that can metabolize constituents of the process gas will begin to dominate. Thus, colonies of bacteria that use, for example, sulfur-containing compounds as their primary energy source will likely propagate due to the availability of constituents such as sulfur compounds in the process gas stream. At such conditions, the pH level typically should begin to fall as sulfuric acid is likely produced by the autotrophic bacteria. Initially, the extent of odor removal may be relatively low, but the performance typically should increase with time and can reach over 99% after, for example, about three to four weeks when the bacteria colony should be fully established. A carbon bed or other polishing unit (not shown) may be attached to outlet 175 to further treat process gas discharged from scrubber column 110, typically until the system 100 is operating at full capacity. The bacteria population may change in response to shifts in the type and concentration of odorous constituents present in the process gas.

In typical operation of odor control system 100, process gas enters scrubber column 110 at inlet 170 for treatment and exits via outlet 175. The process gas may flow through the first scrubber stage 120 and then through the second scrubber stage 130 in series, typically countercurrent to the flow of irrigation fluid. For example, process gas may flow vertically upwards through the first scrubber stage 120 and then through the second scrubber stage 130. Depending upon the selected mode of operation, irrigation fluid to promote bacterial growth is delivered to either the first or second scrubber stages 120, 130, or a combination of both, and flows via gravity towards scrubber sump 160.

Figure 2:
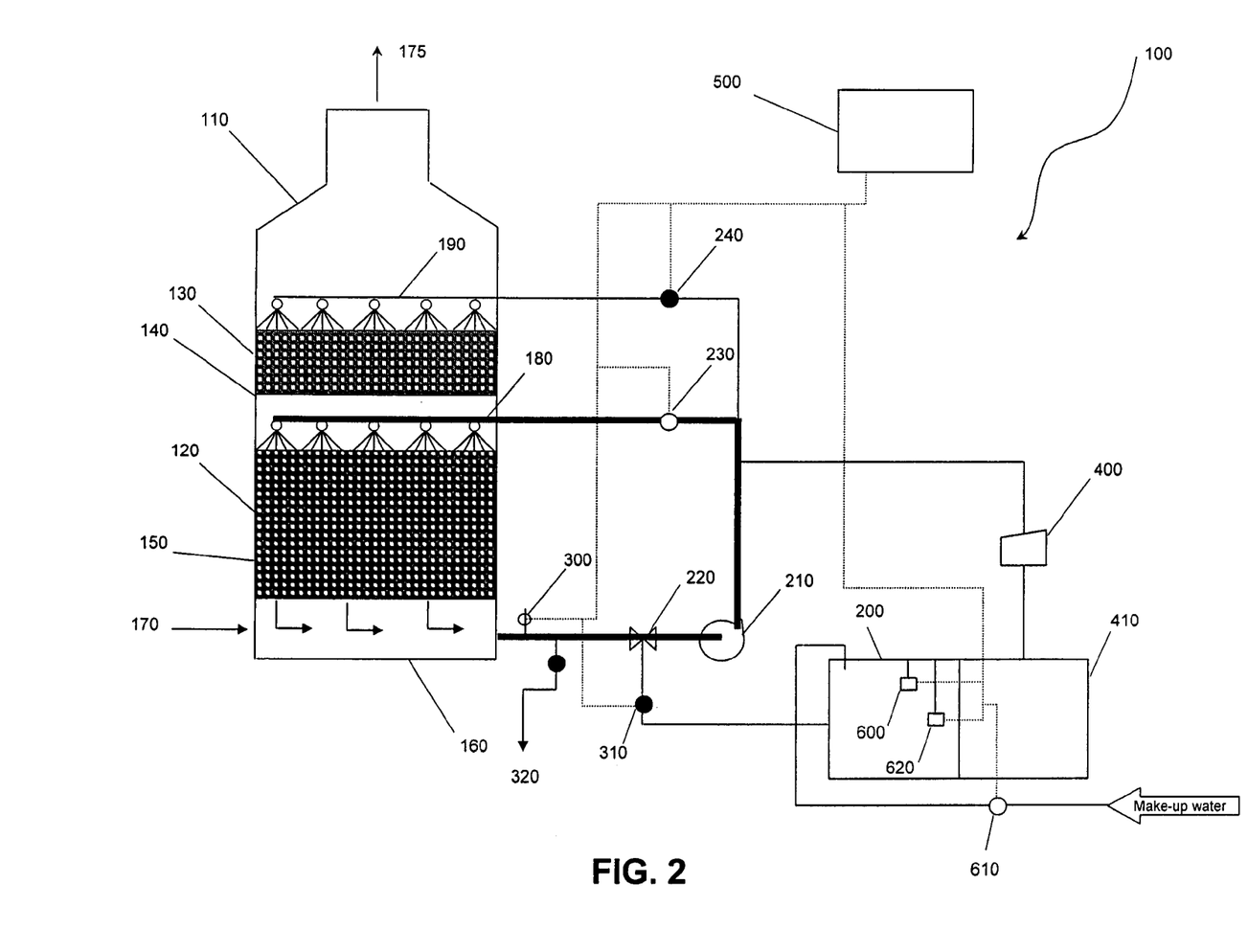
FIG. 2 is a schematic flow diagram of an odor control system illustrating a first liquid circuit, shown as the thicker lines, flowing therein in accordance with one or more embodiments of the invention.

The exemplary modes of operation previously mentioned above will now be described with reference to FIGS. 2-4. Each mode of operation may establish one or more liquid circuits. In the figures, darkened, bold lines represent pathways through which irrigation fluid can flow according to the described liquid circuit. For purposes of illustration, these modes of operating the systems of the present invention may be described with a focus on removal of hydrogen sulfide. However, due to the flexibility of the disclosed system, it is to be understood that process gas containing any odorous constituents treatable by biological scrubbing can benefit from employment of the systems and methods of the present invention.

In a first mode of operation, as discussed above and illustrated in FIGS. 2 and 3, a portion of the scrubber column 110 may be dedicated to target a particular odorous constituent. For example, the first scrubber stage 120 may be maintained at a low pH to promote the growth of bacteria predominantly efficient in removing, at least partially, hydrogen sulfide. The second scrubber stage 130 may then serve as a polishing stage, typically maintained at a higher pH to promote the growth of a wider range of bacteria capable of removing residual target constituent as well as other odorous constituents present in the process gas.

In order to maintain this pH differential, odor control system 100 may recycle irrigation fluid from scrubber sump 160 to the first scrubber stage 120 for a first predetermined time interval, and may add fresh irrigation fluid from irrigation source 200 to the second scrubber stage 130 for a second predetermined time interval, after the first predetermined time interval elapses, through alternating actuation of the first and second liquid circuits. The duration of the first and second predetermined time intervals may vary, for example, to achieve a desired pH differential for a particular odor control application. For example, the second predetermined time interval may be in the range of 1 to 10 minutes out of every hour. In accordance with one or more embodiments of the present invention, irrigation fluid can be recycled to the first scrubber stage 120 for 57 minutes out of every hour and fresh irrigation fluid can be pumped from irrigation source 200 to the second scrubber stage 130 for the remaining 3 minutes out of every hour. Controller 500 may switch between the two types of irrigation methods through alternating actuation of the first and second liquid circuits based on preset time intervals.

Again, in this first mode of operation, the first scrubber stage 120 is primarily efficient in removing, for example, hydrogen sulfide. During the first predetermined time interval, the first liquid circuit, as illustrated in FIG. 2, is established. Irrigation fluid collecting in scrubber sump 160 is recycled to the first scrubber stage 120 along the first liquid circuit via irrigation pump 210 and first fluid distribution device 180. At the onset of the first predetermined time interval, valve 220 can be switched to draw irrigation fluid from the scrubber sump 160 to the irrigation pump 210 and valve 230 can be opened and valve 240 closed in order to direct the irrigation fluid to the first scrubber stage 120. The recycled irrigation fluid distributes through the media packing of the first scrubber stage 120, providing moisture to the sulfur-oxidizing bacteria and rinsing away acidic byproducts of the biological reaction to scrubber sump 160 for further recycling. Thus, the pH level in the first scrubber stage 120 may be maintained at a low level by the recirculation of acidic byproducts, providing an environment favorable to, for example, sulfur-oxidizing bacteria. The recirculation flow rate can be a function of the cross-sectional area of the first scrubber stage 120 in order to provide at least partial wetting and is typically in the range of about 0.5 to 1.0 gal/min per sq ft of media packing, for example, about 0.7 gal/min per sq ft of media packing.

Advantageously, the pH level of the irrigation fluid being recycled from scrubber sump 160 may be maintained within a predetermined range during the first predetermined time interval. It is believed that too low of a pH level may kill or inactivate desirable bacteria. Controller 500 may be capable of monitoring and regulating the operating conditions of odor control system 100, including its components. Controller 500 is typically a microprocessor-based device, such as a programmable logic controller (PLC) or a distributed control system, that receives or sends input and output signals to and from components of odor control system 100. A pH sensor 300 may provide a pH signal to controller 500.

A pH level correction logic control loop may be executed by controller 500. When the pH level reaches a predetermined low set-point, typically in the range of about 1.8 to 2.2 pH units, valve 310 may be opened to allow the inflow of makeup water to dilute the irrigation fluid being recycled, thus adjusting, e.g., raising, its pH level. Makeup water may continue to be added upstream of irrigation pump 210 until pH sensor 300 senses a predetermined high set-point, typically in the range of about 2.2 to 2.5 pH units, triggering the closing of valve 310. Excess irrigation fluid, beyond the volumetric capacity of scrubber column 110, may be drained from scrubber sump 160 by gravity via sump drain 320. In this way, the pH level of the first scrubber stage 120 may be maintained within a desired low pH range during the first predetermined time interval. The drained excess irrigation fluid may be treated for its low pH level and can serve secondary purposes.

In this first mode of operation, the second scrubber stage 130 may remove residual target constituents, for example, hydrogen sulfide, as well as other odorous components such as mercaptans, nitrogen bearing compounds and volatile organic compounds from the process gas stream. Thus, the second scrubber stage 130 may act as a more aggressive polishing stage and/or may be maintained at a higher pH level of about 7 pH units to promote the growth of a broader range of bacteria that can react with a broader range of compounds. The second scrubber stage 130 may comprise more or less surface area in relation to the first scrubber stage 120 depending upon the concentration of constituents targeted to be removed from the process gas stream.

Figure 3:
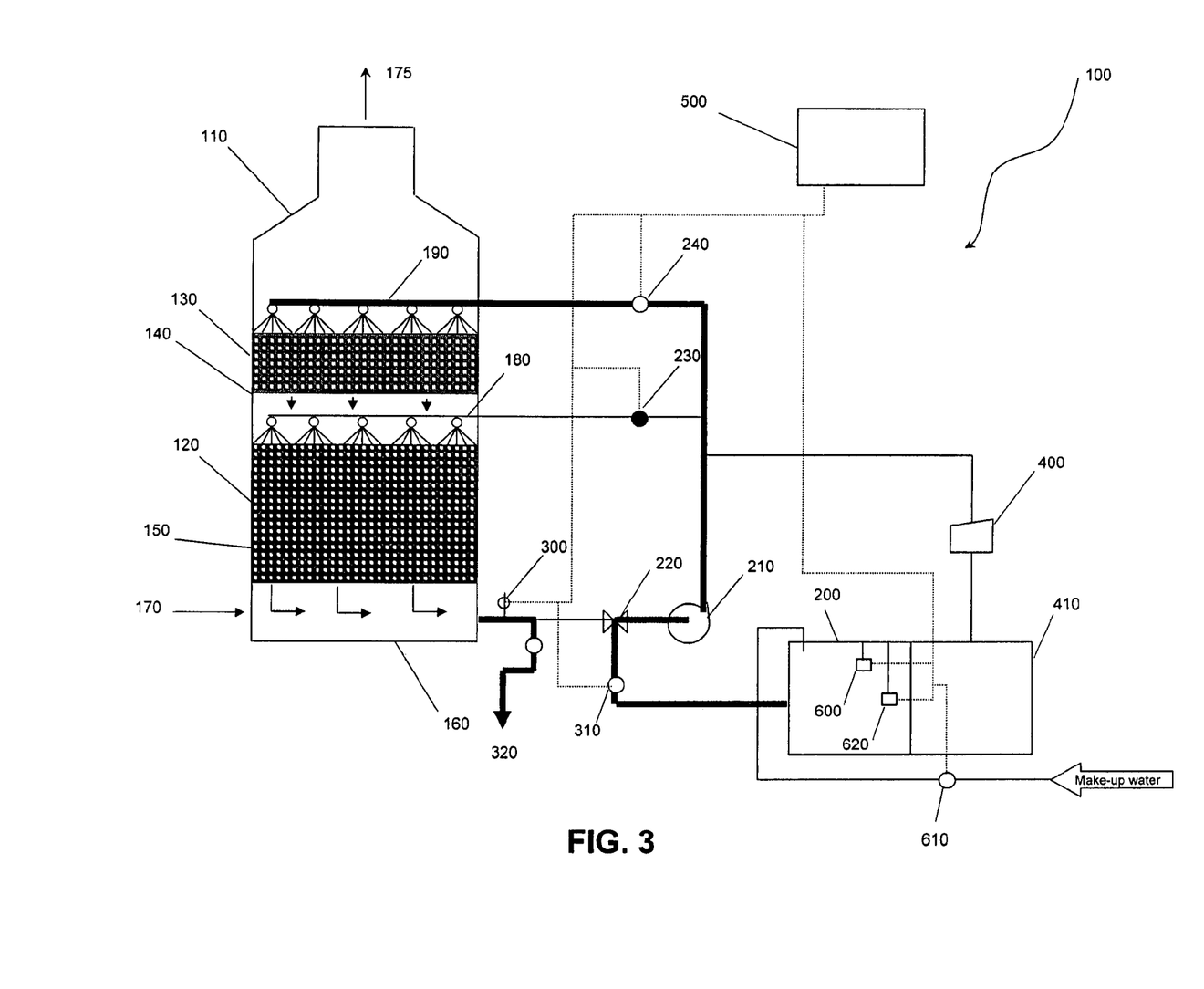
FIG. 3 is a schematic flow diagram of an odor control system illustrating a second liquid circuit, shown as the thicker lines, flowing therein in accordance with one or more embodiments of the invention.

During the second predetermined time interval, the second liquid circuit may be established as illustrated in FIG. 3 to irrigate the second scrubber stage 130 with fresh irrigation fluid, for example having a higher pH, from irrigation source 200. At the onset of the second predetermined time interval, valve 220 can be switched to draw irrigation fluid from the irrigation source 200 to the irrigation pump 210 and valve 230 can be closed and valve 240 opened to direct irrigation fluid to the second scrubber stage 130. Fresh irrigation fluid is distributed to the second scrubber stage 130 along the second liquid circuit via irrigation pump 210 and a second fluid distribution device 190.

During this second predetermined time interval, irrigation fluid typically travels through the second scrubber stage 130 and then through the first scrubber stage 120 to scrubber sump 160. The irrigation fluid that collects in scrubber sump 160 may not be recycled during the second predetermined time interval because its pH level has likely been lowered due to the presence of acidic byproducts of the biological reaction. Instead, irrigation fluid may be drained from scrubber sump 160 by gravity via sump drain 320. Acidic byproducts are thus purged and the pH level in the second scrubber stage 130 likely increases. The pH level of the second scrubber stage 130 may be further controlled by adjusting the pH level of the fresh irrigation fluid in irrigation source 200.

Optionally, irrigation source 200 may be refilled simultaneously as it is drained via a float valve or, alternatively, during each first predetermined time interval when odor control system 100 is recycling irrigation fluid from scrubber sump 160 to the first scrubber stage 120. Refilling may be performed manually. Alternatively, controller 500 may determine if high level switch 600 in irrigation source 200 is activated and, if not, valve 610 may open to refill irrigation source 180 with, for example, plant water or secondary plant effluent until high level switch 600 is activated. If low level switch 620 in irrigation source 200 is activated, controller 500 may instruct odor control system 100 to resume recycling irrigation fluid from scrubber sump 160 to the first scrubber stage 120.

The second mode of operation, as discussed above and illustrated in FIG. 4, may prove beneficial in applications where there may be less advantage to having separate and distinct scrubber stages. The operator of odor control system 100 may be concerned primarily with the removal of one target constituent, for example, where the odors in the process gas stream are predominantly from hydrogen sulfide. Under such operating conditions, both scrubber stages 120, 130 may be maintained at a low pH level to selectively promote the growth of acidophilic, sulfur-oxidizing bacteria. Irrigation fluid can be recycled from scrubber sump 160 to both the first scrubber stage 120 and the second scrubber stage 130 without introducing fresh irrigation fluid into scrubber column 110.

Figure 4:
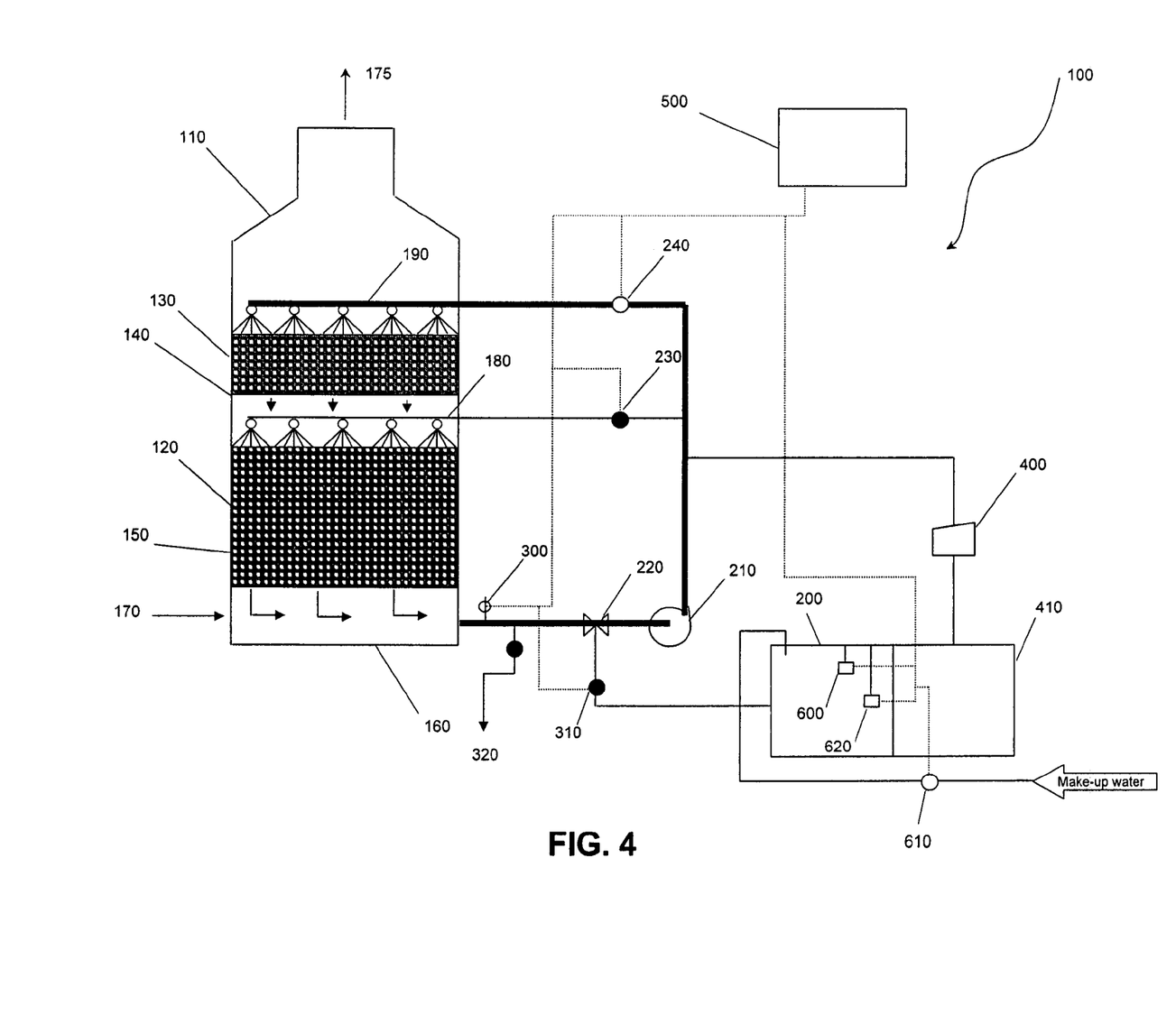
FIG. 4 is a schematic flow diagram of an odor control system illustrating a third liquid circuit, shown as the thicker lines, flowing therein in accordance with one or more embodiments of the invention.

In this second mode of operation, a third liquid circuit may be established as illustrated in FIG. 4. Valve 230 is closed and valve 240 is opened. Valve 220 is switched to draw irrigation fluid from scrubber sump 160 to irrigation pump 210 which can deliver the recycled irrigation fluid containing acidic byproducts to the second scrubber stage 130 via the second fluid distribution device 190. The irrigation fluid can flow through the second scrubber stage 130, then through the first scrubber stage 120 to scrubber sump 160 before being further recycled. Thus, substantially the same pH level may be maintained in both scrubber stages 120, 130 and scrubber column 110 may operate as a recirculating single-stage scrubber, albeit with relatively greater media packing. In this configuration, acidic byproducts are recycled thus lowering the pH level of both scrubber stages 120, 130. Therefore, substantially all of scrubber column 110 may be conducive to the growth of sulfur-oxidizing bacteria, for example, which typically thrive in a low pH environment, providing excellent hydrogen sulfide removal capacity and efficiency.

Advantageously, the pH level of the irrigation fluid being recycled from scrubber sump 160 may be maintained within a predetermined range. Again, too low of a pH level may kill or inactivate desirable bacteria. The pH sensor 300 may provide a pH signal to controller 500 to facilitate maintaining the pH level. A pH level correction logic control loop may be executed by controller 500. When the pH level reaches a predetermined low set-point, typically in the range of about 1.8 to 2.2 pH units, valve 310 may be opened to allow the inflow of makeup water to dilute the recycling irrigation fluid, thus raising its pH level. Makeup water may continue to be added upstream of irrigation pump 210 until pH sensor 300 senses the predetermined high set-point, typically in the range of about 2.2 to 2.5 pH units, triggering the closing of valve 310. Excess irrigation fluid, beyond the volumetric capacity of scrubber column 110, may be drained from scrubber sump 160 by gravity via sump drain 320. In this way, the pH levels of both scrubber stages 120, 130 may be maintained within the desired pH range. The drained irrigation fluid may be treated for its pH level and can serve secondary purposes.

The third mode of operation, as discussed above and illustrated in FIG. 3, may prove beneficial in instances where no single odorous constituent is predominant in the process gas, for example, where the concentration of hydrogen sulfide in the process gas is low. A pH gradient may be created in scrubber column 110 to promote the growth of a wide range of bacteria. Both the first and second scrubber stages 120, 130 may be irrigated with fresh irrigation fluid from irrigation source 200 without any recycling of irrigation fluid containing acidic byproducts from scrubber sump 160. Irrigation may occur in cycles of varying duration and frequency, such as in the range of 1 to 10 minutes out of every hour. For example, fresh irrigation fluid from the irrigation source 200 may be supplied to the first and second scrubber stages 120, 130 for 3 minutes out of every hour. The duration and frequency of the irrigation cycles are customizable for each installation and may be controlled manually or adjustable by timing relays in controller 500.

In this mode of operation, liquid flows along the second liquid circuit as illustrated in FIG. 3. The second liquid circuit can be established by switching valve 220 to draw irrigation fluid from the irrigation source 200 to the irrigation pump 210. Valve 230 can be closed and valve 240 opened to direct irrigation fluid to the second scrubber stage 130. Fresh irrigation fluid can then be distributed to the second scrubber stage 130 via irrigation pump 210 and the second fluid distribution device 190. The irrigation fluid can flow through the second scrubber stage 130, then through the first scrubber stage 120 carrying acidic byproducts towards scrubber sump 160. The irrigation fluid may not be recycled from scrubber sump 160 in order to create the gradient and the excess irrigation fluid is allowed to overflow by gravity via sump drain 320. Thus, in this mode, scrubber column 110 may operate virtually as a single-stage column with a pH gradient ranging from the lowest pH level at the bottom of the first scrubber stage 120 and the highest pH level at the top of the second scrubber stage 130. The pH level may be further controlled by adjusting the pH level of the irrigation fluid in irrigation source 200.

Irrigation source 200 may be refilled simultaneously as it is drained or, alternatively, while scrubber column 110 is not being irrigated. Refilling may be done manually. Alternatively, controller 500 can determine if high level switch 600 in irrigation source 200 is activated and, if not, valve 610 may open to refill irrigation source 200 with, for example, plant water or secondary plant effluent until high level switch 600 is activated.

The odor control system of the present invention should be understood to be capable of operating in additional modes not herein mentioned.

In all modes of operation, any nutrient may be added to the irrigation fluid to promote and enhance the growth of bacteria capable of targeting the desired odorous constituent. For example, the nutrient may be a commercially available, balanced fertilizer designed to enhance the growth of sulfur-oxidizing bacteria. The nutrient can include compounds such as phosphorous, nitrogen and sulfate. Yeast, thiosulfate and chelated iron may also be present. The nutrient may be added to the discharge stream of irrigation pump 210 via nutrient feed pump 400 as illustrated in FIG. 1. Any rate of nutrient addition may be employed to sustain a desired bacterial activity. The feed rate may be set proportional, for example, to the rate at which hydrogen sulfide removed from the process gas stream. The rate of delivery may be controllable through manual adjustment of the speed and stroke of nutrient feed pump 400. Alternatively, a controller 500 may be used to automatically control the addition of the nutrient.

Figure 6:
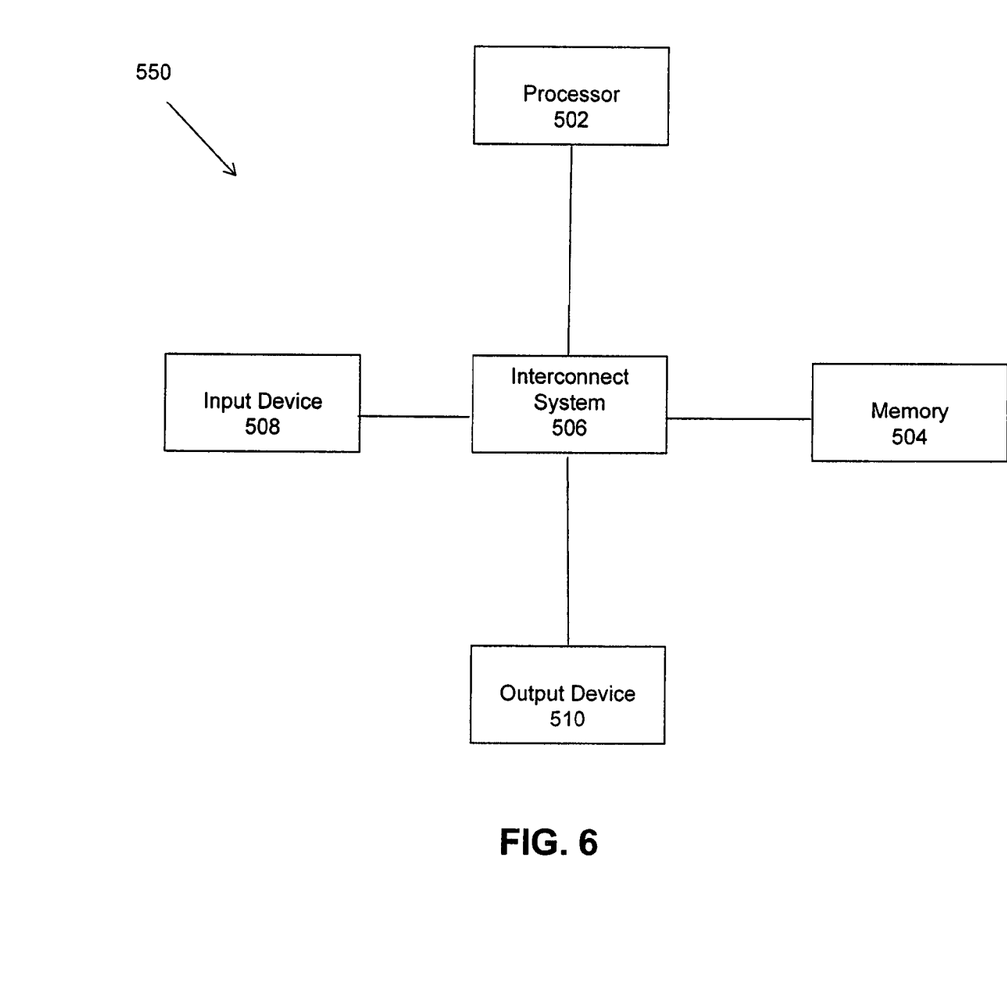
FIG. 6 is a schematic diagram illustrating a computer system upon which one or more embodiments of the invention may be practiced.

The controller 500 may be implemented using one or more computer systems 550 as exemplarily shown in FIG. 6. Computer system 550 may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system 550 may include specially-programmed, special-purpose hardware, for example, an application-specific integrated circuit (ASIC) or controllers intended for fluid treatment systems.

Computer system 550 can include one or more processors 502 typically connected to one or more memory devices 504, which can comprise, for example, any one or more of a disk drive memory, a flash memory device, a RAM memory device, or other device for storing data. Memory 504 is typically used for storing programs and data during operation of odor control system 100 and/or computer system 550. For example, memory 504 may be used for storing historical data relating to the parameters over a period of time, as well as operating data. Software, including programming code that implements embodiments of the invention, can be stored on a computer readable and/or writeable nonvolatile recording medium (discussed further with respect to FIG. 7), and then typically copied into memory 504 wherein it can then be executed by processor 502. Such programming code may be written in any of a plurality of programming languages, for example, Java, Visual Basic, C, C#, or C++, Fortran, Pascal, Eiffel, Basic, COBAL, or any of a variety of combinations thereof.

Components of computer system 550 may be coupled by one or more interconnection mechanisms 506, which may include one or more busses (e.g., between components that are integrated within a same device) and/or a network (e.g., between components that reside on separate discrete devices). The interconnection mechanism typically enables communications (e.g., data, instructions) to be exchanged between components of system 550.

Computer system 550 can also include one or more input devices 508, for example, a keyboard, mouse, trackball, microphone, touch screen, and other man-machine interface devices as well as one or more output devices 510, for example, a printing device, display screen, or speaker. In addition, computer system 550 may contain one or more interfaces (not shown) that can connect computer system 550 to a communication network (in addition or as an alternative to the network that may be formed by one or more of the components of system 550).

According to one or more embodiments of the invention, the one or more input devices 508 may include sensors for measuring parameters of system 100 and/or components thereof. Alternatively, the sensors, the metering valves and/or pumps, or all of these components may be connected to a communication network (not shown) that is operatively coupled to computer system 550. For example, one or more stages 120, 130, and/or components thereof, may be configured as input devices that are connected to computer system 550. Any one or more of the above may be coupled to another computer system or component to communicate with computer system 550 over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be effected by utilizing any suitable technique including but not limited to those utilizing wireless protocols.

Figure 7:
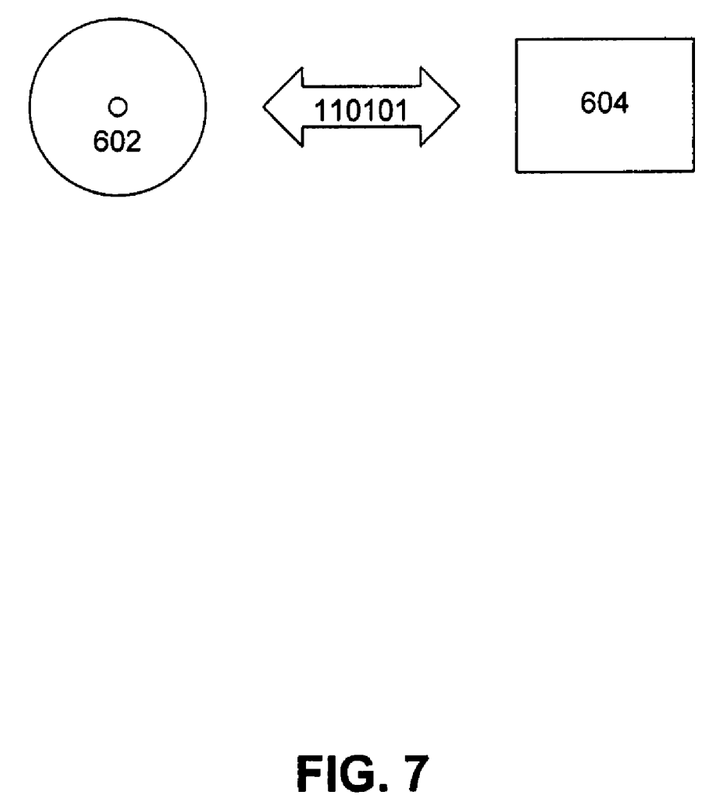
FIG. 7 is a schematic illustration of a storage system that may be used with the computer system of FIG. 6 in accordance with one or more embodiments of the invention.

As exemplarily shown in FIG. 7, controller 500 can include one or more computer storage media such as readable and/or writeable nonvolatile recording medium 602 in which signals can be stored that define a program to be executed by one or more processors 502. Medium 602 may, for example, be a disk or flash memory. In typical operation, processor 502 can cause data, such as code that implements one or more embodiments of the invention, to be read from storage medium 602 into a memory 604 that allows for faster access to the information by the one or more processors than does medium 602. Memory 604 is typically a volatile, random access memory such as a dynamic random access memory (DRAM) or static memory (SRAM) or other suitable devices that facilitates information transfer to and from processor 502.

Although computer system 550 is shown by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller 500, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by controller 500 can be performed in separate computers, which in turn, can be communication through one or more networks.

The invention can further relate to computer-readable media including computer-readable signals stored thereon defining instructions that, as a result of being executed by a computer, instruct the computer to regulate a method of operating a biological scrubber system. The biological scrubber system may be used to control odor in a gas stream. The method may comprise acts of irrigating a first scrubber stage of the biological scrubber system during a first irrigation mode of operation and irrigating a second biological scrubber stage of the biological scrubber system during a second irrigation mode of operation. The first irrigation mode may be performed during a first predetermined time period and the second irrigation mode may be performed during a second predetermined time period. The computer-readable media may be, for example, a disk or flash memory.

It should be appreciated that numerous alterations, modifications and improvements may be made to the illustrated systems and methods.

Although various embodiments exemplarily shown have been described as using sensors, it should be appreciated that the invention is not so limited. For example, rather than requiring any electronic or electro-mechanical sensors, the measurement of levels could alternatively be based upon the senses of an operator.

The invention contemplates the modification of existing facilities to retrofit one or more systems, or components in order to implement the techniques of the invention. Thus, for example, an existing facility can be modified to include a controller executing instructions in accordance with one or more embodiments exemplarily discussed herein. Alternatively, existing control systems can be reprogrammed or otherwise modified to perform any one or more acts of the invention. Existing chemical scrubber systems can be converted to biological scrubber systems in accordance with systems and techniques described herein utilizing at least some of the preexisting equipment such as the shell, packing support and wetted parts.

The invention further contemplates that components of odor control system 100 be skid-mounted to enable pre-packaging and provide portability and/or facilitate retrofitting capabilities.

In other embodiments, irrigation source 200 and nutrient reservoir 410 may be remotely located relative to scrubber column 110.

In another embodiment, irrigation source 200 and nutrient reservoir 310 may be configured in such a way as to serve multiple scrubber columns like that of scrubber column 110. Alternatively, additional irrigation sources and nutrient reservoirs may be provided to serve multiple scrubber columns.

One or more odor control systems 100 may be connected to multiple sources of process gas or process gases.

Manual selection among the various potential modes by an operator of the odor control system may be the most practical, especially if the type and concentration of odorous constituents is typically a constant at any given odor treatment site.

It is contemplated that odor control system 100 may treat a process gas stream wherein the type and concentration of odorous constituents is not constant. More specifically, the ideal mode of operating odor control system 100 may vary with time. Odor control system may adapt to these changing conditions through manual selection among the various operating modes. Alternatively, it is envisioned that controller 500 may monitor the type and concentration of odorous constituents present in the process gas to determine and select the ideal mode of operation. For example, a sensor may be located upstream of inlet 170 to monitor incoming process gas. Monitoring and selection among operating modes may be continuous or performed at regular time intervals.

Because, as discussed, process gas conditions may vary, the invention can react to such variations to advantageously reduce operating requirements. Indeed, the invention can advantageously anticipate operational demand variations to optimize or at least reduce treatment requirements, e.g., reduce operating costs.

Sensors may also be used to detect pressure drop or decrease in flow rate within the system to signal that media packing may need to be changed.

It is further contemplated that a secondary polishing system, such as a chemical scrubber or activated carbon bed, may be connected downstream of scrubber outlet 175 to remove residual odorous constituents from the process gas stream.

In an alternative embodiment, the pH level of the irrigation fluid in scrubber sump 160 may be controlled by adding a compound, such as sodium hydroxide, rather than makeup water.

The function and advantages of these and other embodiments of the invention can be further understood from the examples below, which illustrate the benefits and/or advantages of the system and method of the invention but do not exemplify the full scope of the invention.

EXAMPLE 1

Performance of an Odor Control System Operated in a First Mode

An odor control system was designed substantially in accordance with one or more embodiments of the invention as described above and illustrated in FIG. 1. In this example, the odor control system 100 was operated over the course of a one week period in the second mode of operation discussed above. A liquid circuit was established fluidly connecting the scrubber sump 160 to the second scrubber stage 130, substantially in accordance with the third liquid circuit described above and illustrated in FIG. 4. During operation, irrigation fluid from the scrubber sump 160 was recycled to the second scrubber stage 130, delivering acidic byproducts to both scrubber stages 120, 130. Scrubber column 10 operated virtually as a recirculating single-stage scrubber, maintaining both scrubber stages 120, 130 at a low pH level conducive to the growth of sulfur-oxidizing bacteria. Makeup water was added to maintain a pH level of about 2 within both scrubber stages 120, 130 and nutrient was supplied to further promote the growth of sulfur-oxidizing bacteria. Table 1, below, summarizes the operating conditions and design parameters of the odor control system.

TABLE 1

Operating Conditions and Design Parameters

| Design Parameter | Value |
| --- | --- |
| Air flow capacity | 2,500 cfm max |
| Operating air flow rate | 1,800 cfm |
| Air temperature | 50 to 80 degrees Fahrenheit |
| Air pressure | Ambient, sea level |
| Inlet hydrogen sulfide concentration | Varies daily from 1 to 10 ppm |
| Tower dimensions | 6 ft diameter × 20 ft high |
| Nutrient tank capacity | 150 gallons, 30 days |
| Liquid recirculation rate | 20 gpm |
| Recirculation pH | 2.0 |
| Makeup water addition rate | 1-2 gpm |
| Media type | Model Filtren TR33450 polyurethane foam cubes, 4 × 4 × 4 cm, 10 pores/inch, available from EDT Aktiengesellschaft; Eckental, Germany |
| Nutrient ingredients | Potassium phosphate, magnesium sulfate, urea, chelated iron, yeast extract |
| Nutrient rate | 1.25 gal/day |
| Media depth | 9 ft |
| Media contact time | 8.5 seconds |
| Head loss across media | 0.50 in WC |
| Stack exit velocity | 3200 fpm max, 2300 ft/min normal |

Figure 5A:
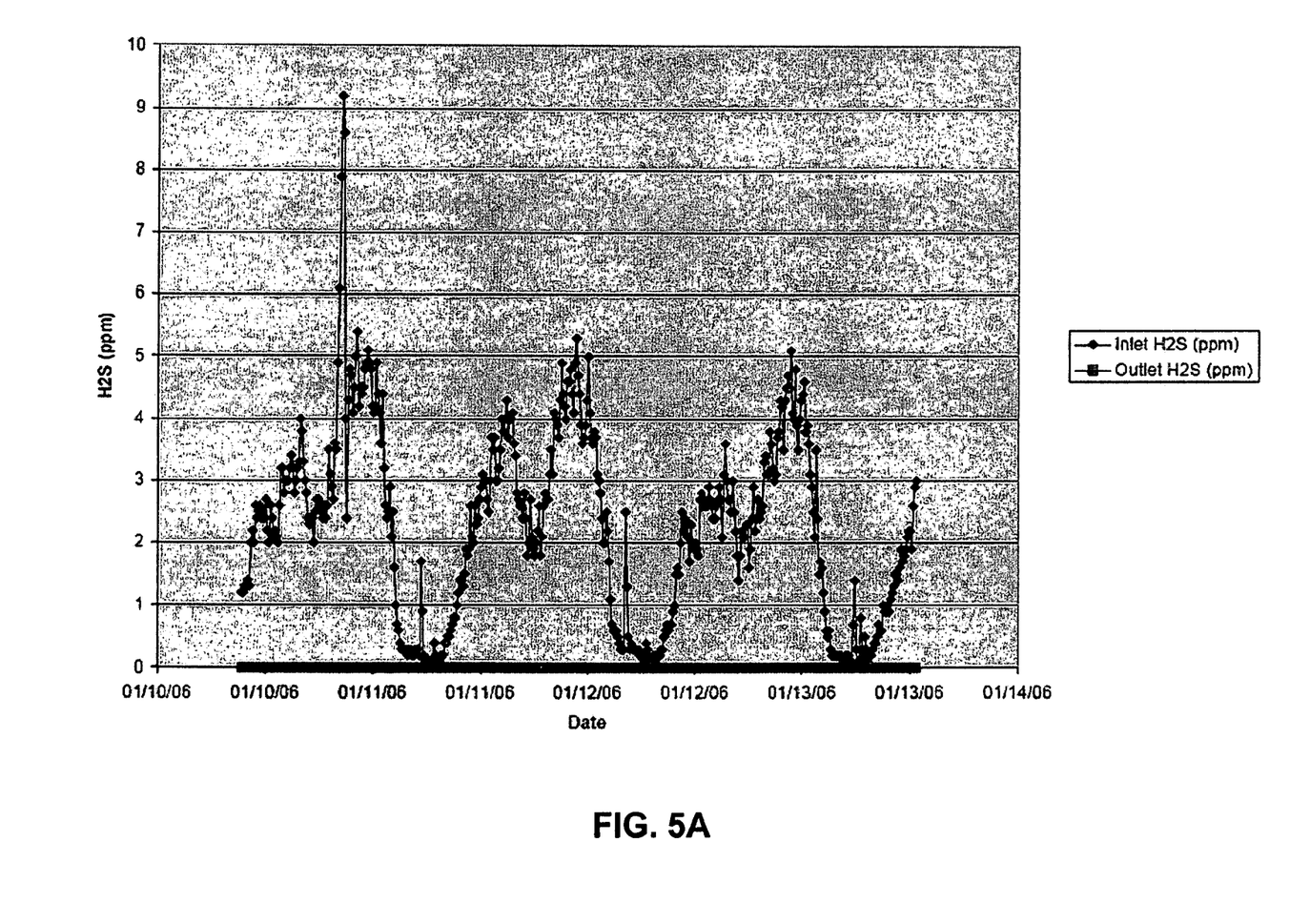
FIGS. 5A and 5B are graphs illustrating output and determined values based on one or more measured process parameters as in Example 1.
Figure 5B:
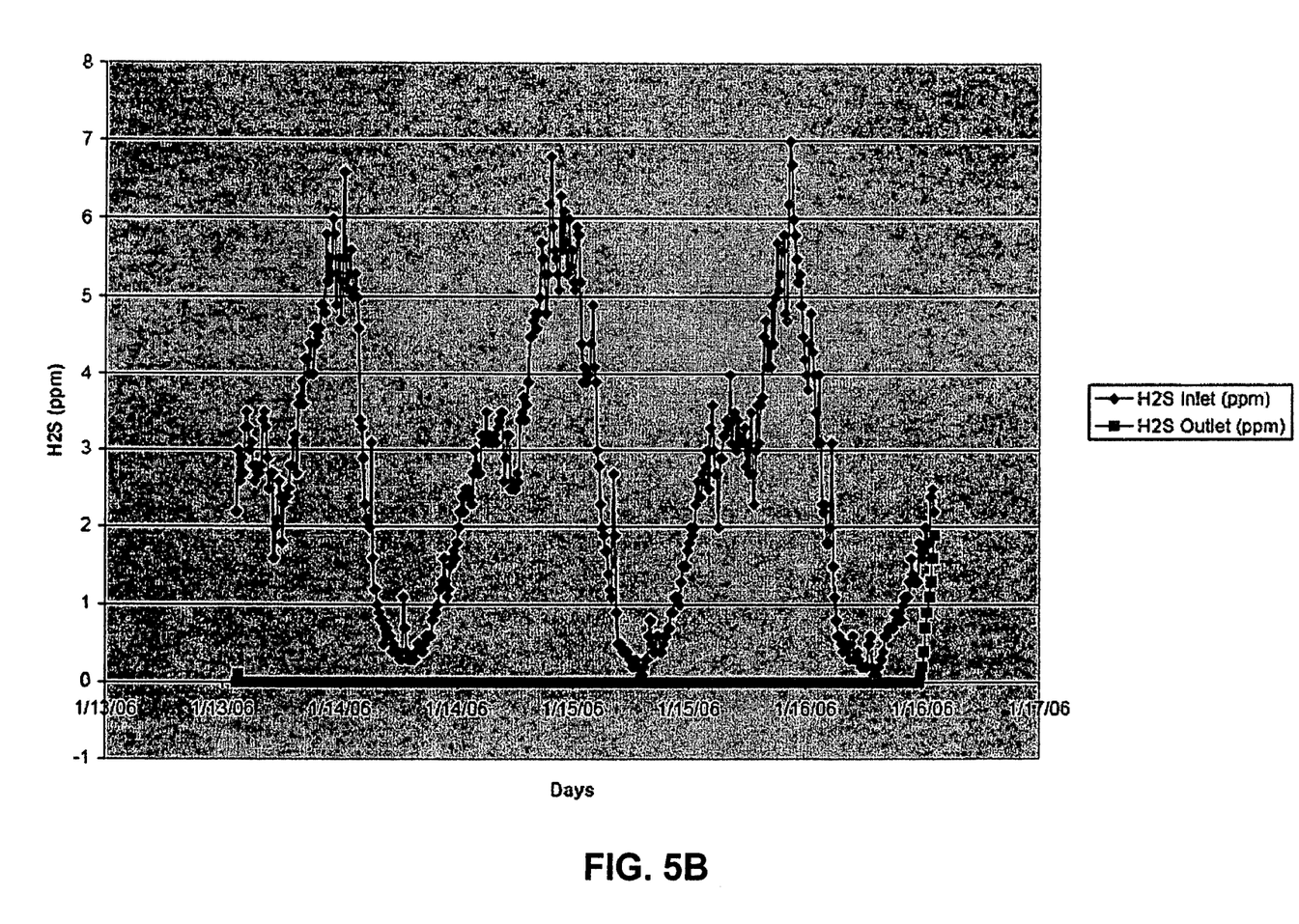

During operation, process gas entered the scrubber column 110 at a rate of about 1,800 cfm. Inlet hydrogen sulfide concentration was monitored over the course of the one week period and ranged from about 1 to 10 ppm as illustrated in FIGS. 5A and 5B. Outlet hydrogen sulfide concentration was also monitored. As illustrated in FIGS. 5A and 5B, the odor control system 100 was consistently efficient in hydrogen sulfide removal over the one week time period, even during peaks in inlet hydrogen sulfide concentration.

EXAMPLE 2

Performance of an Odor Control System Operated in a Second Mode

This prophetic example describes the odor control system as provided in Example 1, but operated substantially in accordance with the first mode of operation described above. Irrigation fluid is recycled along a first liquid circuit, as illustrated in FIG. 2, from scrubber sump 160 to the first scrubber stage 120 for 57 minutes out of every hour, and fresh irrigation fluid is delivered along a second liquid circuit, as illustrated in FIG. 3, from irrigation source 200 to the second scrubber stage 130 for the remaining 3 minutes out of every hour. Thus, the first scrubber stage 120 is maintained at a lower pH level conducive to the growth of, for example, sulfur-oxidizing bacteria, while the second scrubber stage 130 is maintained at a higher pH level conducive to the growth of a wider range of bacteria. Odor control system 100 would be efficient in removing a variety of odorous constituents from process gas, with the first scrubber stage 120 primarily efficient in the removal of, for example, hydrogen sulfide.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the systems and techniques of the invention are used. Those skilled in the art should also recognize, or be able to ascertain, using no more than routine experimentation, equivalents to the specific embodiments of the invention. It is therefore to be understood that the embodiments described herein are presented by way of example only and that, within the scope of the appended claims and equivalents thereto, the invention may be practiced otherwise than as specifically described.

What is claimed is:

1. A method for controlling odor in a gas stream, comprising acts of:
   contacting the gas stream with a first biologically active surface;
   wetting the first biologically active surface with a first liquid stream;
   contacting the gas stream with a second biologically active surface; and
   wetting the second biologically active surface with a second liquid stream during a predetermined time interval; and
   wetting at least a portion of the first biologically active surface with a discharge from the second biologically active surface.

2. The method of claim 1, further comprising an act of controlling a flow of the first liquid stream and a flow of the second liquid stream.

3. The method of claim 2, wherein the act of controlling a flow of the first liquid stream comprises generating a first control signal that regulates the wetting of the first biologically active surface.

4. The method of claim 3, wherein the act of controlling a flow of the second liquid stream comprises generating a second control signal that regulates the wetting of the second biologically active surface.

5. The method of claim 4, further comprising an act of withdrawing liquid from a liquid reservoir to form at least part of the second liquid stream.

6. The method of claim 5, further comprising an act of collecting a mixture of the first and second liquid streams.

7. The method of claim 6, further comprising an act of delivering the mixture to the first biologically active surface.

8. The method of claim 7, further comprising an act of monitoring a pH level of the mixture.

9. The method of claim 8, further comprising an act of adjusting the pH level of the mixture to maintain a predetermined pH level of the mixture.

10. The method of claim 9, further comprising an act of reducing a concentration of any residual target constituent in the gas stream with a polishing system.

11. The method of claim 1, further comprising an act of supplying nutrients to one or more of the first and second liquid streams.

12. The method of claim 1, wherein the act of wetting the first biologically active surface is performed while performing the act of wetting the second biologically active surface.

13. A method for controlling odor in a gas stream, comprising acts of:
   providing a scrubber column;
   establishing a first liquid circuit for a predetermined period of time from a scrubber sump to a first biologically active stage of the scrubber column;
   establishing a second liquid circuit from an irrigation source to a second biologically active stage of the scrubber column after the predetermined period of time has elapsed; and
   contacting the gas stream with the first and second biologically active surfaces to reduce a concentration of odorous constituents therein.

14. The method of claim 13, further comprising an act of delivering a predetermined amount of liquid from the irrigation source to the second biologically active stage before the act of establishing the first liquid circuit.

15. The method of claim 13, further comprising acts of terminating the second liquid circuit and reestablishing the first liquid circuit.

16. The method of claim 13, further comprising an act of maintaining a pH level of the first liquid circuit within a predetermined pH range.

17. A method for treating odor in a gas stream, comprising acts of:
   providing a scrubber column comprising a scrubber sump, a first biologically active stage and a second biologically active stage;

contacting the gas stream with the first and second biologically active stages to reduce a concentration of target constituents;

directing liquid from the scrubber sump to the first biologically active stage;

maintaining a pH level of the liquid from the scrubber sump within a predetermined pH range; and directing liquid from an irrigation source to the second biologically active stage.

18. The method of claim 17, wherein the act of maintaining a pH level of the liquid from the scrubber sump involves draining liquid from the scrubber sump.

19. The method of claim 18, wherein the act of directing liquid from the scrubber sump to the first biologically active stage is performed for a predetermined period of time.

20. The method of claim 19, wherein the act of directing liquid from an irrigation source to the second biologically active stage is performed when the predetermined period of time expires.

21. The method of claim 17, further comprising an act of supplying nutrients to one or more of the first and second biologically active stages.

22. A method of facilitating controlling odor in a gas stream, comprising:

providing a biological scrubber column comprising an inlet fluidly connected to a source of the gas stream; and providing a controller configured to generate a first control signal that establishes a first liquid circuit from a scrubber sump to the biological scrubber column and further configured to generate a second control signal that establishes a second liquid circuit from an irrigation source to the biological scrubber column.

23. A method of modifying an existing biological odor control system, comprising:

providing a computer-readable medium including computer-readable signals stored thereon defining instructions that, as a result of being executed by a computer, instruct the computer to perform a method of regulating operation of a biological scrubber system comprising acts of:

irrigating a first biological scrubber stage of the biological scrubber system during a first irrigation mode of operation; and irrigating a second biological scrubber stage of the biological scrubber system during a second irrigation mode of operation;

wherein the first irrigation mode is performed during a first predetermined time period and the second irrigation mode is performed during a second predetermined time period.

* * * * *